United States Patent [19]

Wakeman et al.

[11] 4,000,612
[45] Jan. 4, 1977

[54] COOLING SYSTEM FOR A THRUST VECTORING GAS TURBINE ENGINE EXHAUST SYSTEM

[75] Inventors: Thomas G. Wakeman, West Chester; Dudley O. Nash, Forest Park, both of Ohio

[73] Assignee: General Electric Company, Cincinnati, Ohio

[22] Filed: July 28, 1975

[21] Appl. No.: 599,644

[52] U.S. Cl. .................. 60/230; 60/266; 60/271; 239/265.35

[51] Int. Cl.² .............. F02K 1/12; F02K 1/20; F02K 11/04

[58] Field of Search ........... 60/230, 229, 266, 271, 60/39.66; 239/265.33–265.43

[56] References Cited

UNITED STATES PATENTS

| | | | |
|---|---|---|---|
| 2,831,321 | 4/1958 | Laucher | 60/266 |
| 3,004,385 | 10/1961 | Spears et al. | 239/265.41 |
| 3,046,730 | 7/1962 | Petren | 239/265.39 |
| 3,091,082 | 5/1963 | Newcomb et al. | 60/266 |
| 3,214,905 | 11/1965 | Beavers et al. | 239/265.41 |

FOREIGN PATENTS OR APPLICATIONS

| | | | |
|---|---|---|---|
| 1,279,495 | 11/1960 | France | 60/230 |

Primary Examiner—Carlton R. Croyle
Assistant Examiner—Robert E. Garrett
Attorney, Agent, or Firm—Robert C. Lampe, Jr.; Derek P. Lawrence

[57] ABSTRACT

A thrust vectoring gas turbine engine exhaust nozzle is provided with a variable area flow path wherein cooling of the stationary flow path side walls is partially obtained by the film cooling technique. Regulating means, such as a valve, is provided to control the pressure drop of the cooling fluid across the walls as a function of nozzle flow path area, thus optimizing the coolant flow rate as a function of flow path area. Where a rotating bonnet-type deflector is employed to divert the exhaust stream downward to obtain a vertical take-off and landing capability, a system is provided to cool the deflector walls by both the impingement and convection cooling techniques. A favorable pressure gradient for the cooling fluid is obtained by exhausting the cooling fluid to ambient pressure whenever the deflector is deployed. Another valve is provided to regulate the flow of coolant to an expansion flap when the deflector is in its stowed position external to the flow path.

16 Claims, 9 Drawing Figures

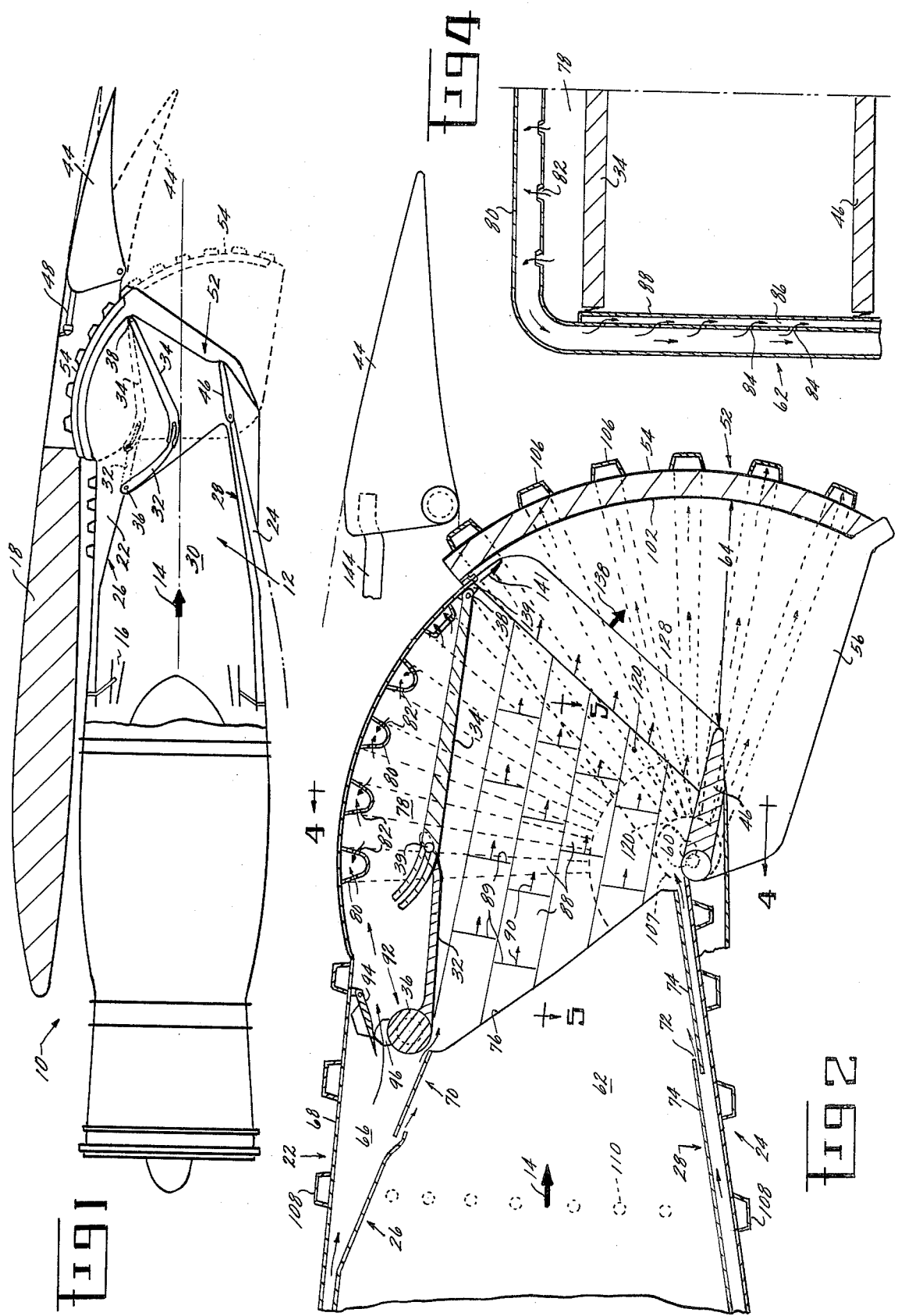

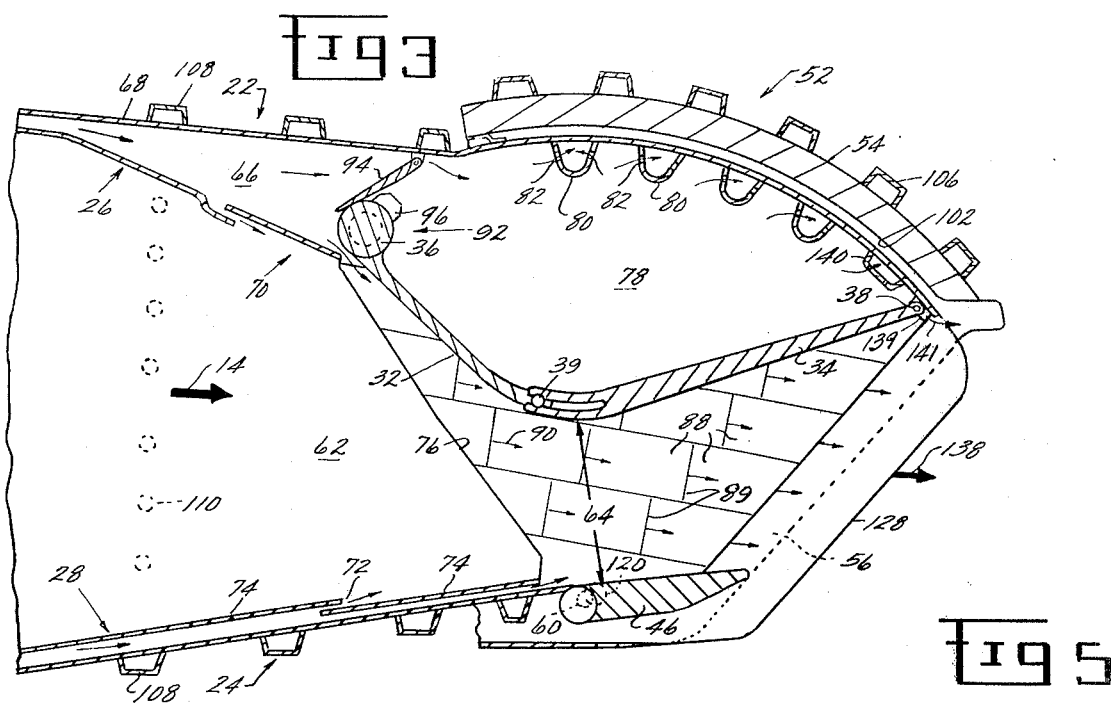
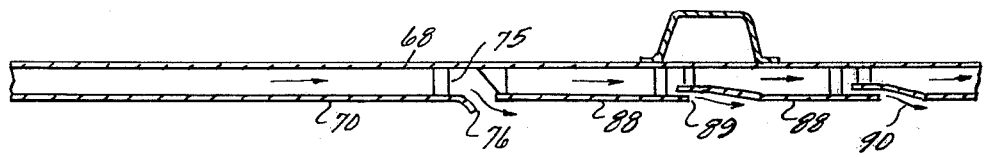
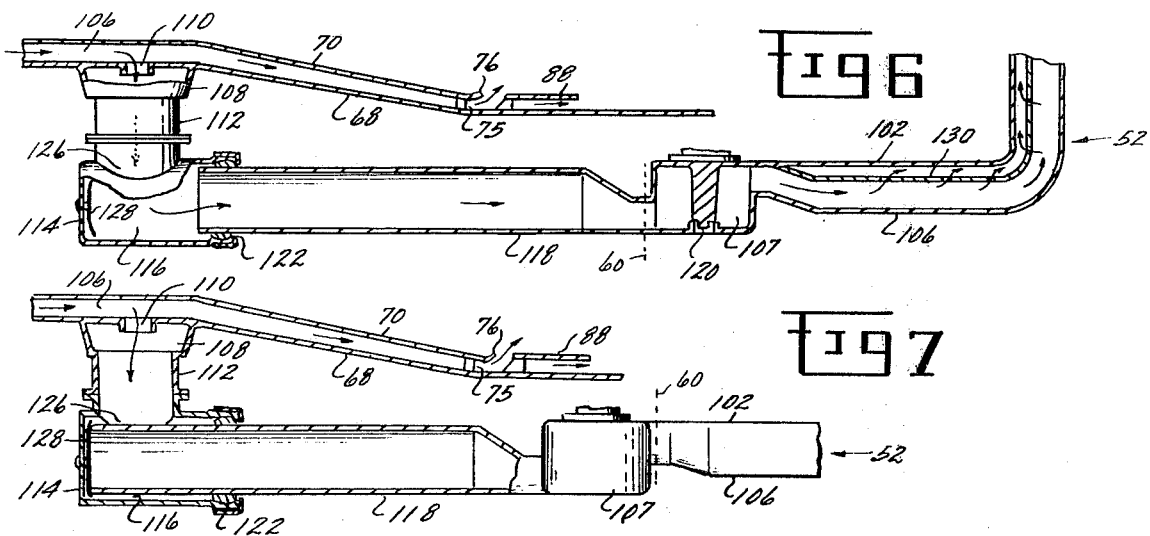
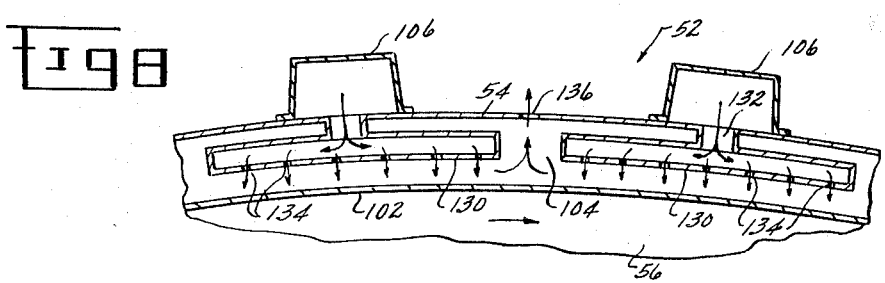

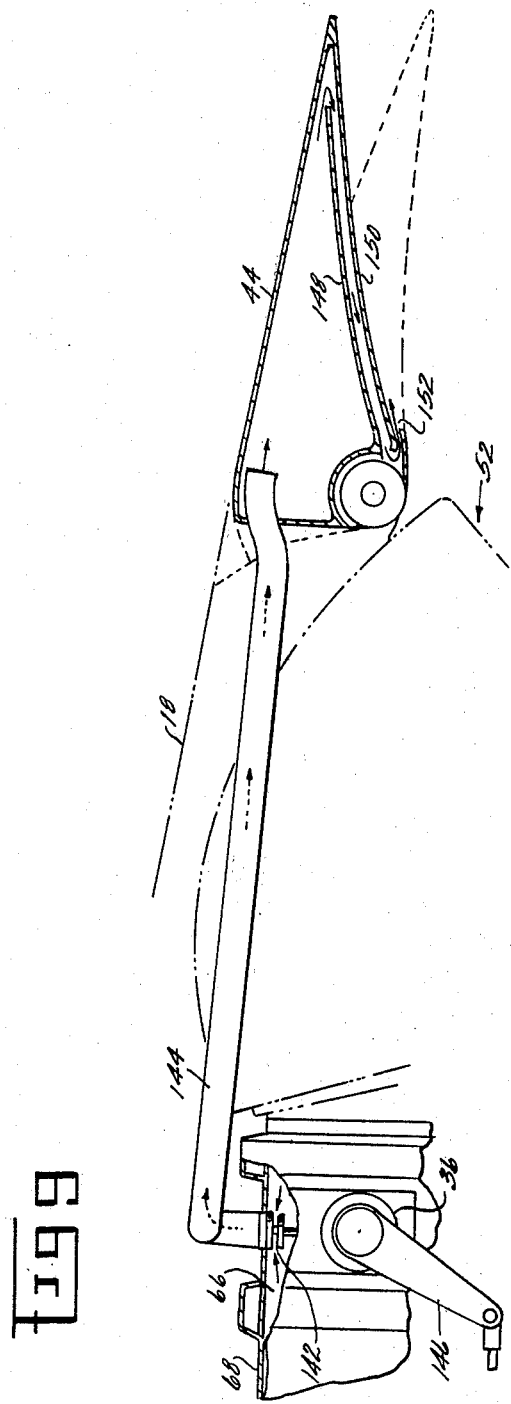

COOLING SYSTEM FOR A THRUST VECTORING GAS TURBINE ENGINE EXHAUST SYSTEM

The invention herein described was made in the course of or under a contract or subcontract thereunder (or grant) with the department of the Navy.

BACKGROUND OF THE INVENTION

This invention relates to gas turbine engine exhaust nozzles and, more particularly, to cooling systems for use therein.

The high velocity imparted to the exhaust gases of a gas turbine engine by the exhaust nozzle provides the thrust for propulsion. This thrust is substantially parallel with, and opposite to the direction of, exhaust gases exiting the nozzle. Consequently, if the direction of the exhaust gases is changed, the direction of propulsive thrust is correspondingly varied. Typically, aircraft gas turbine engines are provided with nozzles which are fixed in the axial direction and the aircraft maneuvering is accomplished solely by airframe control surfaces.

Advanced aircraft configurations contemplate, and may even require, the selective redirection (or vectoring) of gas turbine engine thrust in order to enhance aircraft performance and to provide the aircraft with operational characteristics heretofore deemed impractical. Copending patent applications, Ser. No. 572,340, filed Apr. 28, 1975, "Flight Maneuverable Nozzle For Gas Turbine Engines," — Nash et al, and Ser. No. 572,341, filed Apr. 28, 1975, "Actuating Means For A Thrust Vectoring Gas Turbine Engine Exhaust Nozzle," — Nash, which are assigned to the same assignee as the present invention and the disclosures of which are incorporated herein by reference, teach a flight maneuverable exhaust nozzle and means for actuating same which will efficiently and practically alter the direction of gas turbine engine exhaust nozzle gases. Effective integration of a thrust vectorable gas turbine engine within a vertical/short take-off and landing (V/STOL) aircraft requires a gas turbine engine which achieves high thrust levels to avoid the weight penalties associated with auxiliary lift engines and which would be used only during the take-off and landing flight phases. To achieve such high lift thrust levels, high temperature augmentation (afterburning) is required, and one key to a successful engine is an effective cooling scheme for the V/STOL exhaust nozzle.

Particularly severe cooling problems are characteristic of V/STOL exhaust systems for augmented operation. In particular, a conventional augmented exhaust system (no V/STOL capability) experiences only minor changes in pressure and velocity along the exhaust stream flow path. This means that efficient film cooling can be achieved by use of constant-area slots or holes for injecting the cooling film, with only minor changes in coolant flow rate and distribution resulting as the operating conditions are varied. By comparison, the V/STOL exhaust systems of the type described in the aforementioned copending patent applications have severe gas stream pressure variation and cooling flow control problems. These systems are efficient in the lift mode due to the variable flow path geometry, the throat being rotated with the deflector so that the gas flow is turned upstream of the throat and velocities substantially lower than sonic velocity. Serious pressure losses are thus avoided and efficient performance results. This feature, while benefiting performance, results in difficult coolant flow control since the changes in flow path geometry produce wide variations in velocity and pressure of the hot gas along the flow path. Thus, a means is needed to regulate V/STOL nozzle cooling flow under the varying exhaust stream pressure conditions. Adequate cooling flow in the lift mode must be provided when flow path cross-sectional areas are large, velocities low and exhaust stream static pressures high. Adequate, but not excessive, coolant flow must also be provided when operating in the cruise mode with smaller flow path cross-sectional areas, high velocities and correspondingly low exhaust stream static pressures.

Furthermore, cooling of the surface which turns or deflects the hot exhaust stream is difficult since, due to the impingement which results from turning the exhaust flow, the exhaust stream pressure is as great or greater than the fan air pressure which is the preferred source of coolant. This condition precludes use of film cooling and, in general, prevents coolant from flowing from the relatively low pressure, cool side of the deflector liner to the relatively high pressure, hot side. An effective, reliable means is required for cooling the critical flow deflecting surface.

In addition, a means is needed for supplying an adequate cooling supply to the rotatable deflector in such a way that the coolant flows only when operating in the V/STOL mode. By terminating coolant flow when the deflector is stowed in the cruise position, maximum exhaust system efficiency and aircraft cruise range is assured.

In short, the need for the coolant flow control is very important for two reasons: first, there is much more area to be cooled in the V/STOL mode than in the cruise mode and thus more coolant flow is required; secondly, the exhaust stream gas pressure is generally higher in the lift mode since all of the flow path is upstream of the nozzle throat. This means that the film coolant pressures must be correspondingly high. In the cruise mode, however, the throat is located further forward and the gas stream pressures are consequently lower. If coolant pressure is not reduced when in the cruise mode, excessive cooling flows will result with severe performance penalties. Additionally, other hot surfaces upstream of the nozzle (such as turbine blades and vanes) may be starved of coolant with resultant overheating.

SUMMARY OF THE INVENTION

Accordingly, it is the primary object of the present invention to provide a thrust vectoring gas turbine engine exhaust nozzle with improved cooling capability.

It is a further object of the present invention to provide means to regulate V/STOL cooling flow under the varying exhaust stream pressure conditions associated with variations of the exhaust stream flow path area.

It is yet another object of the present invention to provide cooling means for exhaust gas deflectors upon which exhaust gases impinge at pressure levels in excess of cooling fluid source pressures.

It is still another object of the present invention to supply an adequate cooling supply to exhaust gas deflectors only when they are being impinged by the hot exhaust stream.

These and other objects and advantages will be more clearly understood from the following detailed description, drawings and specific examples, all of which are intended to be typical of rather than in any way limiting to the scope of the present invention.

Briefly stated, the above objectives are accomplished by providing a flow path defining wall of the exhaust nozzle with a thermal liner. A cooling plenum external to the flow path receives cooling fluid, from which the fluid is directed, through passages, over the liner in the known film cooling technique. Regulating means, such as a valve, is provided in the cooling fluid conduit supplying the plenum, the cooling fluid pressure tending to force the valve closed. Means are provided to override the cooling fluid pressure and open the valve when the nozzle flow path area increases (and vice versa) through an operative connection with the nozzle flow path area actuation means. In one embodiment, the overriding means comprises a cam formed upon the variable area actuation mechanism, the cam riding upon, and adapted to open, the valve.

The exhaust gas deflector is provided with an internal cavity which is in fluid communication with a pressurized source. Because the hot surfaces are exposed to impinging exhaust gases at pressures in excess of the coolant source, the deflector is impingement cooled with the spent cooling fluid being vented to ambient pressure, thereby establishing a favorable pressure gradient for the cooling fluid. The deflector internal cavity is supplied by a deflector coolant tube which forms an integral portion of the deflector support structure. The inlet end of the deflector coolant tube is telescopically received within a bore and cooperates with the bore inlet to form a variable area orifice, the size of the orifice (and thus the quantity of coolant flow) being a function of the degree of penetration of the coolant tube within the bore which, in turn, is dependent upon deflector position.

Where an expansion flap is included to provide exhaust stream expansion control and flight maneuver vectoring when the deflector is in the stowed position, another regulating means, such as a valve, is provided to control the flow of cooling fluid to the interior of the expansion flap. This valve is also operatively connected to the exhaust nozzle flow path variable area actuator such that when the nozzle area increases the coolant flow rate increases, and vice versa. The cooling fluid is then exhausted over the flap to provide cooling by the known film cooling technique.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings, in which:

FIG. 1 diagrammatically depicts in partial cut-away a wing-mounted gas turbine engine incorporating the subject invention;

FIG. 2 is an enlarged schematic view of the exhaust nozzle of FIG. 1 depicting the cooling system of the present invention in one operating mode;

FIG. 3 is an enlarged schematic view, similar to FIG. 2, depicting the cooling system of the present invention in another operating mode;

FIG. 4 is a partial cross-sectional view taken along line 4—4 of FIG. 2 and depicting side wall cooling in greater detail;

FIG. 5 is a partial cross-sectional view taken along line 5—5 of FIG. 2;

FIG. 6 is an enlarged partial fragmentary view depicting the deflector cooling system in the operating mode of FIG. 2;

FIG. 7 is an enlarged partial fragmentary view, similar to FIG. 6, of the deflector cooling system in the operating mode of FIG. 3;

FIG. 8 is an enlarged cut-away view of a portion of the cooling system for the exhaust nozzle deflector; and FIG. 9 is an enlarged schematic representation of the cooling system for the exhaust nozzle expansion flap.

DESCRIPTION OF THE PREFERRED EMBODIMENT

Referring to the drawings wherein like numerals correspond to like elements throughout, attention is first directed to FIG. 1 wherein a gas turbine engine, depicted generally at 10, and which can embody the present invention, is diagrammatically shown. Hot gases of combustion are expanded through a turbine (not shown) in a manner well known in the art and enter exhaust nozzle 12 from the left as depicted by a vector 14. In the embodiment of FIG. 1, the gas turbine engine has been augmented by an afterburner 16 of a variety known in the art. After passing through exhaust nozzle 12 the flow is vectored from the nozzle in a manner described in detail in the afore-mentioned copending patent application Ser. No 572,340.

As can be readily seen from FIGS. 1, 2 and 3, the exhaust system depicted is of the external expansion type with internal nozzle area variation. Such a configuration can be conformably nested with an aircraft wing 18, for example, to provide an aerodynamically streamlined package and simultaneously provide integration between the variable geometry exhaust nozzle and aircraft wing flap system, thereby eliminating redundancy.

The exhaust nozzle is shown to include two substantially opposed walls designated generally at 22, 24, the inner surfaces of which (26, 28, respectively) partially define an exhaust stream flow path 30. Wall 22 is further defined by variable nozzle area means comprising cooperating nozzle flaps 32, 34, each hinged at one end, 36, 38, respectively, to wall 22. The other ends are connected, as by a cooperating roller and cam arrangement 39. The exhaust stream flow path 30 area is thus controlled, in part, by the positioning of the nozzle flaps.

The variable flap 44 located downstream of the nozzle flaps provides flight maneuver vectoring as well as exhaust stream expansion control. As shown, flap 44 comprises a portion of the trailing edge of wing 18, the wing comprising part of the aircraft structure. However, in other embodiments, a flap may be engine or fuselage mounted. Flap 44 may be maneuvered by known actuating means 48. A variable area ventral flap 46 which forms the downstream extremity of wall 24, cooperates with nozzle flaps 32 and 34 to partially control the area of exhaust stream flow path 30 and provide exhaust stream expansion control. Further, ventral flap 46 provides nozzle throat area control in the V/STOL modes.

For V/STOL operation, a rotating bonnet-type deflector 52 is used to deflect the exhaust stream downward. Deflector 52 possesses a substantially U-shaped, cross-sectional profile, as most clearly depicted in FIGS. 4 and 6, and consists of an arcuate deflector portion 54 flanked by two pie-shaped arm members 56. During cruise operation (FIGS. 1 and 3), the deflector is stowed within side wall 22 so that it does not compromise the aerodynamically smooth contours of the flow path 30. Thus, it does not affect high cruise nozzle efficiency. In the V/STOL mode, as represented by FIG. 2, the deflector 52 is rotated about its pivot connections (only one of which is shown at 60) into flow path 30, thereby deflecting the exhaust stream toward the downward direction.

Referring now to FIGS. 2 through 9, an improved system for cooling the thrust vectoring exhaust nozzle of FIG. 1 is diagrammatically shown. Essentially, the cooling system may be considered as comprising three sub-systems, each uniquely adapted to provide cooling for a specific exhaust nozzle component. In particular, cooling sub-systems are provided to cool the substantially opposed stationary side walls 62 (FIG. 4), the rotating deflector 52 and expansion flap 44. However, as will be discussed hereinafter, the functioning and sequencing of the sub-systems are directly related to the flow path geometry variation.

As previously discussed, the type of vectoring exhaust nozzle as depicted herein is efficient in the V/STOL mode because, in part, the nozzle throat 64 is rotated with deflector 52 so that the exhaust stream is turned upstream of the throat at velocities substantially lower than sonic velocity. However, variations in the flow path area create significant changes in the static pressure distributions due to the effects of the exhaust stream on the side wall 62. Adequate cooling flow in the V/STOL mode of FIG. 2 must be provided when the flow path cross-sectional areas are large and the static pressures relatively high. Large flow path areas are associated with high temperature, augmented operation which is required to achieve the necessary high V/STOL thrust levels and avoid auxiliary lift devices (like lift fans). Use of conventional film cooling techinques, sized to the V/STOL requirements, is undesirable since this would provide an excessive coolant flow rate in the cruise mode of FIG. 3 where the exhaust velocities are higher and the static pressures lower (the lower exhaust stream static pressure thus creating an unnecessarily high cooling fluid pressure potential between the coolant source and the exhaust stream flow path).

Directing attention to FIGS. 2 through 5, an improved means for cooling the side wall 62 is diagrammatically shown. Cooling fluid, typically air, from a preferred coolant source such as the gas turbine engine fan (not shown) is fed through a passage 66 formed between a nozzle outer structural casing 68 and an inner thermal liner 70. The thermal liner is of the variety having a slot 72 between each pair of adjacent, overlapping liner segments 74 through which a film of cooling fluid is discharged over the hot exhaust stream face of the liner in the well-known manner. A slot 75 is provided between the downstream terminus 76 of thermal liner 70 and casing 68 which discharges a cooling film for further cooling of the downstream casing 68 (FIG. 5). The flow path area bounded by liner 70 does not experience geometric changes during transition from V/STOL to cruise modes and, thus, the variations in static pressure due to the exhaust gas may be substantially ignored in sizing slots 72. The pressure of the cooling fluid within passage 66 will always exceed that on the hot exhaust stream face of liner 70 and, with proper slot sizing, positive coolant flow will result.

However, aft of liner terminus 76 the large area variations cannot be ignored for reasons already enumerated. Accordingly, cooling fluid from passage 66 is fed into plenum 78 formed, in one embodiment, between the structural casing 68 and the converging and diverging flaps 32 and 34, respectively. Hollow structural ribs 80 support casing 68 (which may be of sheet metal construction) and extend into plenum 78. As with the casing, the ribs are substantially of U-shaped profile with the base of the U in plenum 78 and the legs extending along the side walls (FIG. 4). Cooling fluid enters through the plurality of apertures 82 communicating between the cooling plenum and the interior of the ribs and is carried along the side walls as clearly shown in FIG. 4. Thus, the ribs serve the dual function of casing structural members and coolant distribution supply ducts. The coolant subsequently discharges through a plurality of apertures 84 in the legs of the ribs and into coolant passage 86 whereupon it impinges upon a face of heat shield 88 partially defining flow path 30. Thereafter, it exits through slots 89 (FIG. 2) between adjacent heat shields to form a cooling film as represented by vectors 90.

A first regulating means, such as coolant flow valve 92, is provided within passage 66 to control the flow of coolant fluid as a function of flow path area. In particular, as taught by the previously cited copending patent application Ser. No. 572,341, the forward end of the convergent flap 32 is attached to a drive shaft which comprises hinge point 36. Thus, rotation of the drive shaft directly controls the area of flow path 30 through displacement of operatively connected flaps 32 and 34. It therefore becomes convenient to utilize the same drive shaft to control the flow of cooling fluid to plenum 78. Accordingly, the valve 92 includes a shutter 94 pivotably connected to the casing 68 and adapted to ride upon a protruding cam 96 formed upon shaft 36. Pressure of the cooling fluid tends to force the shutter closed and into engagement with the cam. The cam is so located circumferentially upon shaft 36 that when the convergent flap 32 is in its most open position (the afterburning, V/STOL mode) the shutter is forced open by the cam, thus overriding the coolant pressure within passage 66 and permitting the maximum amount of coolant to flow to plenum 78 as shown in FIG. 2. Because cam 96 is not a full-span cam it does not substantially hinder the flow of coolant to the plenum in the open position. In the cruise mode, when less cooling is required, the cam is circumferentially displaced from the shutter 94, substantially closing the valve, thereby increasing the coolant pressure drop across the valve and lowering the pressure within plenum 78. This, in turn, reduces the coolant flow rate from the plenum. In this manner, the exhaust nozzle cooling flow is regulated automatically to correspond to the exhaust stream static pressure conditions associated with variations in the flow path area.

An added benefit of the above-described system is that the cooling plenum pressure is used to augment the actuation forces necessary to position flaps 32 and 34, thus reducing the required actuator size and weight.

A second critical area with regard to V/STOL nozzle cooling is the cooling of rotating deflector 52. The deflector experiences unique cooling problems in that, since the hot exhaust stream impinges upon the deflector, the deflector senses at least a portion of the exhaust stream dynamic head which, when combined with the static pressure of the exhaust stream, creates a pressure approaching that of the preferred coolant source. Therefore, film cooling by itself is inadequate to cool the hot face of the deflector. Accordingly, impingement cooling becomes the primary technique for cooling the deflector, with augmented cooling provided by the film cooling technique as discussed hereinafter.

Referring to FIG. 8, it may be seen that the arcuate deflector portion 54 carries and supports a deflector thermal liner 102 in spacial relationship to form a deflector plenum 104 therebetween into which a plurality of impingement cans 130 have been inserted. The impingement cans are adapted to receive a flow of cooling fluid from a plurality of hollow structural ribs 106 which are similar to ribs 80 within plenum 78. Ribs 106 extend across the outward side of arcuate deflector structure 54 and arms 56, adding rigidity thereto and ultimately converging at a common rotating joint 107. The impingement cans 130 communicate with the interior of ribs 106 by means of apertures 132 in deflector portion 54, and cooling fluid received by the cans exits through a plurality of holes 134 therein into impingement with liner 102. The spent cooling fluid exits plenum 104 through apertures 136 between adjacent cans which provide communication between plenum 104 and ambient conditions behind deflector portion 98. While FIG. 8 depicts the arcuate deflector portion in detail, it can be appreciated that the arms 56 may be fabricated and cooled in a similar manner.

Referring to FIGS. 3, 6 and 7, the deflector cooling fluid is tapped from passage 66 upstream of valve 92 by means of a hollow structural rib 108 which serves as a manifold at least partially circumscribing the nozzle casing 68 and enclosing a plurality of bleed ports 110 disposed therein. Cooling fluid collected by the manifold is routed via conduits 112 on either side of the nozzle to a rigid housing 114 having a bore 116 therein. The bore receives, in telescopic relationship, deflector coolant tube 118 which communicates between the bore and rotating joint 107. The rotating joint provides fluid communication between deflector coolant tube 118 and the structural ribs 106 previously described, and is fixed to the deflector at pivot connection 120.

Since the deflector coolant tube pivot connection 120 is not coincident with the deflector pivot 60, rotation of the deflector causes pivot point 120 to orbit about pivot 60 imparting a degree of axial translation to the deflector coolant tube 118 with respect to the rigidly fixed housing 114. Angular displacement of the deflector coolant tube with respect to housing 114 is absorbed by a uniball bearing 122 which also compensates for misalignment in all planes since it is convenient to fabricate the nozzle of sheet metal, the expansion and contraction of which, under varying heat loads, could otherwise cause interference and binding. The interface between the rotating deflector 52 and the translating coolant tube 118 is the factor necessitating rotating joint 107.

The coolant supply tube 118 serves as a valve to shut off the coolant flow when the nozzle is operating in the cruise mode. In particular, the coolant supply tube cooperates with the inlet 126 to bore 116 to form second regulating means in the form of a variable area orifice, the area of which being a direct function of the degree of penetration of the coolant tube within the bore. When the deflector is in the stowed position (FIGS. 3 and 7) there is no need for deflector cooling since it is stowed external to the flow path. Thus, inlet 126 is closed by the coolant tube, the end of which engages elastic diaphragm 128 to completely terminate the coolant flow. In the V/STOL mode of FIGS. 2 and 6, inlet 126 is opened and coolant is permitted to flow through the deflector coolant tube and into structural ribs 106 whereupon it is delivered to the impingement cans 130 as previously discussed.

The foregoing system provides for a positive flow of coolant fluid from the coolant source to the deflector whenever the inlet 126 to housing 114 is open since the downstream end of this cooling circuit always terminates at apertures 136 which communicate with ambient air behind the deflector. Thus, the powerful effects of impingement cooling have been utilized since the ambient air will always be at a pressure lower than the preferred coolant source, thereby establishing favorable pressure gradients for the cooling fluid flow. The system is also rapid acting, providing full coolant flow to the deflector as soon as it is deflected into the exhaust gas stream for V/STOL operation. The degree of coolant flow is directly dependent upon deflector position because the deflector directly controls the orifice size of inlet 126 through deflector coolant tube 118.

In order to limit the airflow required through the coolant tube 118, cooling in the regions of the deflector immediately downstream of casing 68 is augmented by film cooling discharged from a trailing edge slot 128 formed between the casing 68 and heat shield 88, the film represented by vector 138 (FIG. 2). It is convenient to use the most aft of ribs 80 to carry cooling fluid from plenum 78 to slot 128. Additionally, film cooling of the deflector is provided by an opening 139 within hinge 38 of flap 34 which allows cooling fluid from plenum 78 to flow across deflector 52 as indicated by vector 141.

FIG. 9 depicts the cooling scheme for the third major component, the expansion and control flap 44. Cooling fluid from passage 66 is supplied to the expansion control flap by way of third regulating means, such as second valve 142, and conduit 144. Valve 142 may be of the poppet valve variety cammed to drive shaft 36 which is operated by nozzle area drive train 146. In the non-augmented cruise mode when flaps 32 and 34 are in the minimum area position, valve 142 is cammed open and coolant fluid is permitted to flow to the interior of flaps 44. The expansion flap has a convection baffle 148 formed therein proximate the exhaust stream surface comprising heat shield 150. To provide effective cooling of the heat shield, counterflow cooling is provided using a combination of convection and film cooling. The coolant flows in a forward direction between the convection baffle 148 and the heat shield 150 to convection cool the heat shield. Ultimately, it passes through slot 152 and is directed over the heat shield to form a cooling film.

Furthermore, slot 139 (FIG. 2) at the aft hinge 38 of divergent flap 34 aids in film cooling of expansion flap 44, the slot being adapted to pass a portion of the cool air directly from plenum 78 over the flap. This slot varies in area with the angle of flap 34. In V/STOL operation, as previously discussed, the slot is full open providing the required deflector film cooling. In the cruise mode, the slot area decreases with nozzle area until it is at a minimum area for non-augmented operation, thus benefiting performance and cooling expansion flap 44.

Thus, an efficient cooling system has been provided for a thrust vectoring exhaust nozzle. By means of valves which meter cooling flow as a function of flow path area and deflector position, and by creating favorable pressure gradients for the cooling circuit, sufficient coolant pressure and flow is provided for the high temperature V/STOL operation. Furthermore, coolant pressures and flows have been reduced during the cruise mode of operation to maximize cruise performance and aircraft range.

It will be obvious to one skilled in the art that certain changes can be made to the above-described invention without departing from the broad inventive concepts thereof. For example, the cooling sub-systems taught herein may be used individually or collectively depending upon the exhaust nozzle configuration. Furthermore, the cooling circuitry may be rearranged to fit into different nozzle envelopes without departing from the teachings herein. It is intended that the appended claims cover these and all other variations in the present invention's broader inventive concepts.

Having thus described the invention, what is claimed as novel and desired to be secured by Letters Patent of the United States is:

1. A cooling system for a gas turbine engine exhaust nozzle having a variable position flap partially defining an exhaust stream flow path, a fixed wall further defining the flow path, and actuating means for positioning the flap, the cooling system comprising:
   a plenum partially defined by the flap and external to the flow path;
   first passage means for introducing cooling fluid into said plenum;
   means for exhausting the cooling fluid from said plenum; and
   first means connected to the actuating means for regulating the cooling fluid pressure level entering said plenum, wherein the first regulating means comprises a first valve which is held closed by the pressure of the cooling fluid when the actuating means is in a first operative position, and means to override the cooling fluid pressure and open the first valve when the actuating means is in a second operative position.

2. The cooling system of claim 1 wherein the overriding means comprises a cam formed upon the actuating means, and the first valve is adapted to be lifted by the cam.

3. The cooling system of claim 1 wherein the overriding means is adapted to open the first valve as flow path area increases and permit the first valve to close when flow path area decreases.

4. The cooling system of claim 1 wherein the exhausting means comprises a hollow nozzle casing structural rib disposed partially within the plenum, the hollow interior of the rib having fluid communication with the plenum and the wall.

5. The cooling system of claim 4 further comprising aperture means within the wall between said plenum and the flow path for passing a cooling fluid film over the wall.

6. The cooling system of claim 4 further comprising thermal liner means disposed over a portion of the wall and forming a cooling cavity therebetween, means for passing cooling fluid from said rib into said cavity and into impingement with said liner, and means for ejecting said cooling fluid from said cavity and into the exhaust stream as a cooling film over the wall.

7. The cooling system of claim 4 wherein the structural rib is of substantially inverted U-shaped cross section when viewed perpendicular to the exhaust nozzle longitudinal axis, the base of the U disposed within the plenum and a leg of the U providing structural support to the wall.

8. The cooling system of claim 1 wherein the variable position exhaust nozzle flap partially defines a flow path throat when the actuating means is in the first operative positon, and the wall further defines the throat.

9. A cooling system for a gas turbine engine exhaust nozzle having a variable position flap partially defining an exhaust stream flow path, an actuating means for positioning the flap, and a rotating deflector positionable between a stowed position external to the flow path and a deployed position further defining the flow path, the cooling system comprising:
   a plenum partially defined by the flap and external to the flow path;
   first passage means for introducing cooling fluid into said plenum;
   means for exhausting the cooling fluid from said plenum;
   first means connected to the actuating means for regulating the cooling fluid pressure level entering said plenum;
   a thermal liner carried by the rotating deflector;
   a deflector plenum disposed between the deflector and the liner;
   means rotatable with the deflector for introducing cooling fluid into the deflector plenum;
   means to impinge cooling fluid upon the thermal liner;
   means for exhausting cooling fluid from the deflector plenum to a location external to the nozzle flow path where the pressure level is less than that of the coolant source; and
   second regulating means to control the flow of cooling fluid to the deflector plenum as a function of deflector position.

10. The cooling system of claim 9 wherein the second regulating means is disposed between the coolant source and the deflector plenum, the second regulating means comprising:
   a rigid housing having a bore therein;
   an inlet for introducing cooling fluid into the bore;
   a bore exit; and
   deflector coolant tube means, one end of which is received in telescopic relationship within the housing, wherein it cooperates with the inlet to form a variable area orifice, and another end of which is operatively connected to the means for introducing fluid into the deflector plenum.

11. The cooling system of claim 10 wherein the means for introducing cooling fluid into the deflector plenum comprises a hollow deflector structural rib, the hollow interior of the deflector rib having fluid communication with the deflector plenum and another end of the deflector coolant tube means.

12. The cooling system of claim 11 wherein the variable area orifice is adapted to open when the deflector is in the deployed position and close when the deflector is in the stowed position.

13. The cooling system of claim 12 wherein the second regulating means further comprises seal means within the bore to seal the one end of the deflector coolant tube means and prevent the flow of cooling fluid therethrough when the deflector is in the stowed position.

14. A cooling system for a gas turbine engine exhaust nozzle having a first variable position flap partially defining an exhaust stream flow path, an actuating means for positioning the first flap, and a second variable position flap for exhaust gas expansion control downstream of the first flap, the cooling system comprising:

a plenum partially defined by the first flap and external to the flow path;

first passage means for introducing cooling fluid into said plenum;

means for exhausting the cooling fluid from said plenum;

first means connected to the actuating means for regulating the cooling fluid pressure level entering said plenum;

conduit means for introducing cooling fluid to the interior of the second flap, means for exhausting cooling fluid from the second flap interior and directing same over the second flap exterior partially bounding the exhaust stream flow path; and second regulating means to control the flow of cooling fluid to the second flap; said second regulating means responsive to a change in position of the actuating means.

15. The cooling system of claim 14 wherein the third regulating means comprises a second valve disposed between the coolant source and the conduit means, the valve means being operatively connected to the actuating means.

16. The cooling system of claim 15 wherein the second valve means is adapted to open as the flow path area decreases, and vice versa.

* * * * *